United States Patent [19]

Hait

[11] Patent Number: 4,539,973
[45] Date of Patent: Sep. 10, 1985

[54] PORTABLE OUTDOOR COOKING UNIT WITH DEVICE FOR EXTINGUISHING THE FLAME OF CANNED JELLY ALCOHOL AND THE LIKE

[75] Inventor: Paul W. Hait, Los Gatos, Calif.
[73] Assignee: Pyromid, Inc., Los Gatos, Calif.
[21] Appl. No.: 668,311
[22] Filed: Nov. 5, 1984
[51] Int. Cl.³ ............................................... F24C 5/00
[52] U.S. Cl. ...................................... 126/43; 126/9 R
[58] Field of Search ........................... 126/43, 9 R, 9 B

[56] References Cited

U.S. PATENT DOCUMENTS

| | | | |
|---|---|---|---|
| 3,371,659 | 3/1968 | Paspalas | 126/43 |
| 3,667,446 | 6/1972 | Morton | 126/9 |
| 3,765,397 | 10/1973 | Henderson | 126/9 R |
| 4,508,094 | 4/1985 | Hait | 126/9 |

OTHER PUBLICATIONS

European Patent Application No. 109,144 Published May 5, 1984,–Inventor, Hait et al.

*Primary Examiner*—Carroll B. Dority, Jr.
*Attorney, Agent, or Firm*—Jack M. Wiseman

[57] ABSTRACT

A collapsible cooking unit comprising a support on which is disposed a truncated pyramidal support member. The support member is foldable. Disposed on the support member is an inverted truncated pyramidal firebox, which is foldable. A griddle-cover seats on the firebox for cooking food. A container of canned jellied alcohol or the like seats on the support. A device is supported by the firebox which is adaptable for extinguishing the flames of canned jellied alcohol or the like seated on the support.

12 Claims, 5 Drawing Figures

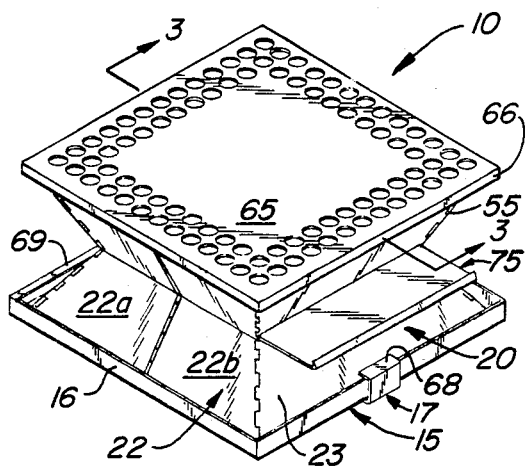
FIG._1.
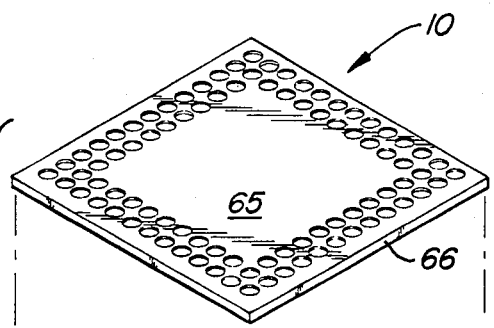
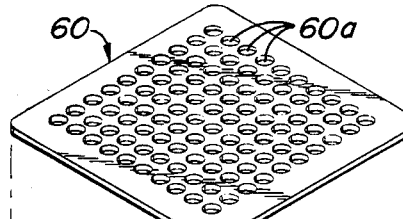
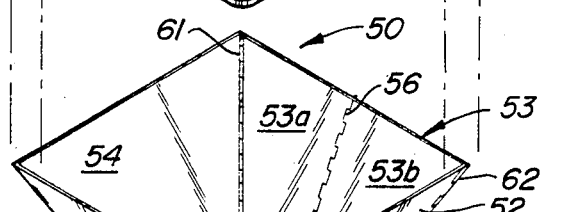
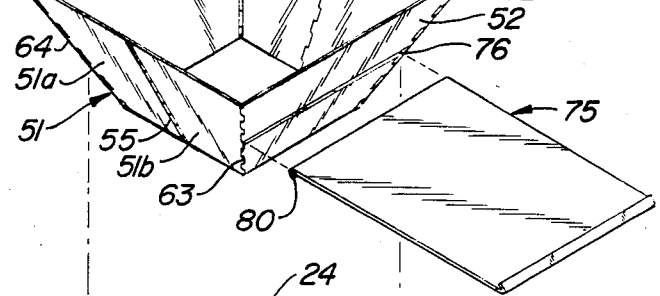
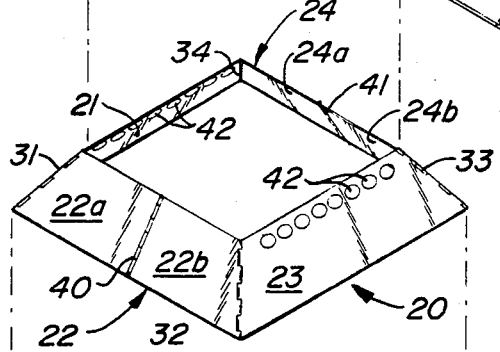
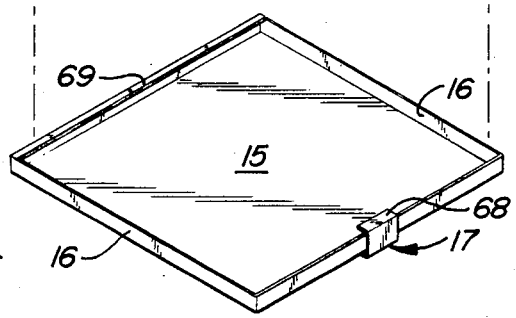
FIG._2.

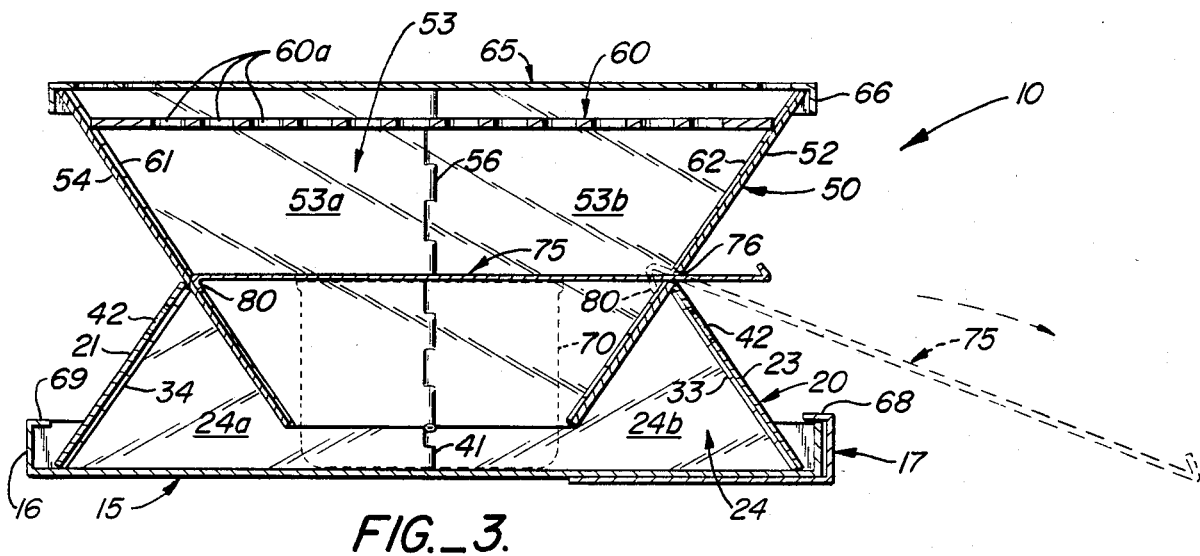
FIG._3.
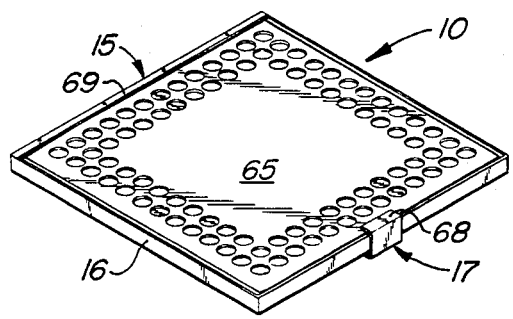
FIG._4.
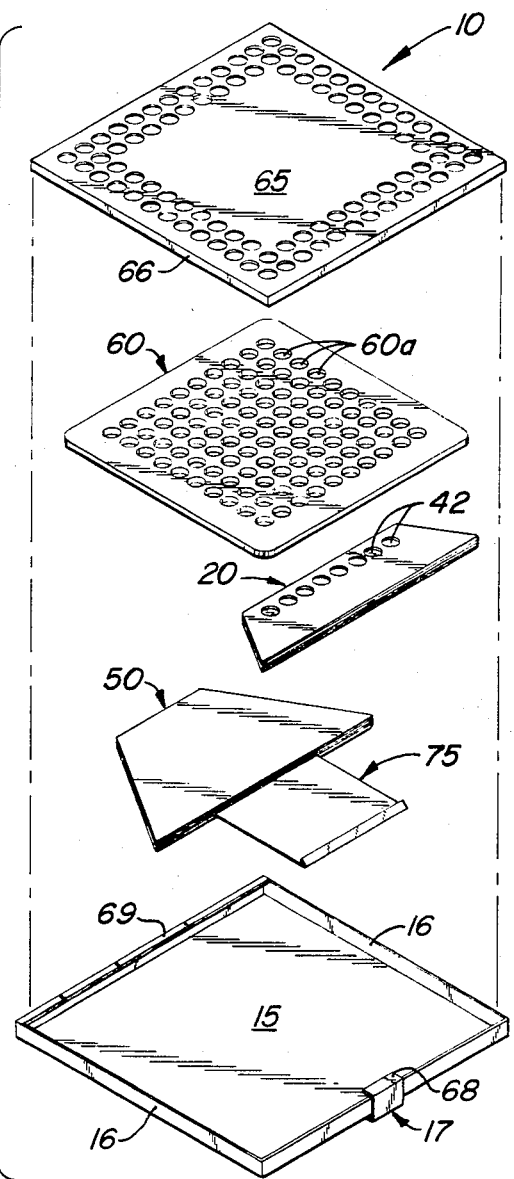
FIG._5.

PORTABLE OUTDOOR COOKING UNIT WITH DEVICE FOR EXTINGUISHING THE FLAME OF CANNED JELLY ALCOHOL AND THE LIKE

BACKGROUND OF THE INVENTION

The present invention relates in general to outdoor cooking units, and more particularly to an outdoor cooking unit that is collapsible to facilitate transporting and storage.

Cooking units that are adapted to be disassembled and effectively enclosed in a container for ease of transporting on a camping trip or the like are already available. One such unit, which is disclosed in my pending application, Ser. No. 06/440,984 filed on Nov. 12, 1982, now U.S. Pat. No. 4,508,094, for Convertible Cooking Unit, is particularly adapted to be used outdoors as an environmentally enclosed heating and cooking system. Other cooking units, that are customarily used on patios for barbequing and the like, have provisions for disassembling or collapsing to promote easy storage. However, the arrangement of the parts of a cooking unit that is used in outdoor cooking is considerably different than the arrangement of parts of cooking units used for patio cooking. In view of the fact that many people who participate in camping activities occasionally desire to enjoy the experience of outdoor cooking, there is a need for a cooking unit that may be arranged in a compact form for ease in transporting and storage and is capable of being used to perform heating and cooking functions. A collapsible cooking unit that is compact and lends itself to the use of flammable fuels, such as canned jellied alcohol or the like, has been needed for outdoor use and patio use.

SUMMARY OF THE INVENTION

A cooking unit includes a truncated pyramidal support member and a truncated pyramidal firebox that is positionable on the support member. A base on which the support member is dispose is adaptable for supporting a container of flammable fuel, such as canned jellied alcohol and the like.

An object of the present invention is to provide a reliable outdoor stove that is compact and transportable, and yet employs a dry fuel, canned jellied alcohol, and the like.

A feature of the present invention is a device that is embodied in the cooking stove of the present invention for extinguishing the burning fuel, such as canned jellied alcohol and the like.

Another feature of the present invention is that the burning fuel is fully enclosed and sheltered from the weather elements, such as wind and rain.

Another feature of the present invention is a grill disposed below a griddle-cover for improved heat distribution at the cooking surface of the griddle-cover.

DESCRIPTION OF THE DRAWINGS

FIG. 1 is a perspective view of a cooking unit embodying the present invention.

FIG. 2 is an exploded perspective view of the cooking unit shown in FIG. 1.

FIG. 3 is a vertical cross-section of the cooking unit shown in FIG. 1 taken along line 3—3 of FIG. 1.

FIG. 4 is a perspective view of the cooking unit shown in FIG. 1 in its compact transporting and storing mode.

FIG. 5 is an exploded perspective view of the cooking unit shown in FIG. 1 in its compact transporting and storing mode.

DESCRIPTION OF THE PREFERRED EMBODIMENTS

Illustrated in FIGS. 1 and 2 is a cooking unit 10 comprising a base or support 15 having a quadrilateral configuration. The base 15 includes upstanding flanges 16 along the periphery thereof and a yieldable upstanding latch 17. In the preferred embodiment, the base or support 15 is made of stainless steel. A container of flammable fuel, such as canned jellied alcohol, seats on the base or support 15.

Disposed on the base 15 within the perimetric flanges 16 thereof is a foldable support member or support collar 20 having a truncated, pyramidal configuration in its extended state. In the preferred embodiment, the support member or support collar 20 is made of stainless steel. The support member 20 comprises side panels 21-24. Each side panel 21-24 has a trapezoidal configuration. Juxtaposed non-parallel edges of the side panels 21-24 are joined by suitable hinges 31-34. The panels 22 and 24 are confronting panels that are respectively formed by adjacent panel sections 22a, 22b and 24a, 24b.

The panel sections 22a and 22b of the panel 22 are joined at their adjacent edges by a suitable hinge 40 and the panel sections 24a and 24b of the panel 24 are joined at their adjacent edges by a suitable hinge 41. The adjacent edges of the panel sections 22a and 22b joined by the hinge 40 are orthogonal to the parallel edges of the panel 22 and are located generally midway between the non-parallel edges thereof. Similarly, adjacent edges of the panel sections 24a and 24b joined by the hinge 41 are orthogonal to the parallel edges of the panel 24.

To fold the support member or support collar 20 into a compact state, the panels 22 and 24 are folded inwardly about their respective hinges 40 and 41 so that the panels 22 and 24 are disposed between the confronting panels 21 and 23 with the hinges 40 and 41 adjacent one another. Thus, the support member 20 can assume a folded, generally flat compact state or an extended, truncated pyramidal configuration.

In the extended state, the support member 20 is hollow and has a larger, lower open end and a smaller upper open end. Formed in the panels 21 and 23 of the support member 20 are openings 42 for the circulation of air to aid in the combustion of fuel. Disposed above the support member 20 is a firebox or cooking chamber 50, which has an inverted, truncated, pyramidal configuration in its extended state. In the preferred embodiment, the firebox or cooking chamber 50 is made of stainless steel. The firebox 50 comprises side panels 51-54. Each side panel 51-54 has a trapezoidal configuration. Juxtaposed non-parallel edges of the side panels 51-54 are joined by suitable hinges 61-64. The panels 51 and 53 are confronting panels that are respectively formed by adjacent panel sections 51a, 51b and 53a, 53b.

The panel sections 51a and 51b of the panel 51 are joined at their adjacent edges by a suitable hinge 55 and the panel sections 53a and 53b of the panel 53 are joined at their adjacent edges by a suitable hinge 56. The adjacent edges of the panel sections 51a and 51b joined by the hinge 55 are orthogonal to the parallel edges of the panel 51 and are located generally midway between the non-parallel edges thereof. Similarly, adjacent edges of the panel sections 53a and 53b of the panel 53 joined by the hinge 56 are orthogonal to the parallel edges of the panel 53 and are located generally midway between the non-parallel edges thereof.

To fold the firebox or cooking chamber 50 into a compact state, the panels 51 and 53 are folded inwardly about their respective hinges 55 and 56 so that the panels 51 and 53 are disposed between the confronting panels 52 and 54 with the hinges 55 and 56 adjacent one another. Thus, the firebox or cooking chamber 50 can assume a folded, generally flat compact state or a extended inverted, truncated pyramidal configuration.

In the extended state, the firebox or cooking chamber 50 is hollow and has a smaller, lower open end and a larger, upper open end. The lower smaller open end of the firebox 50 is disposed over the smaller, upper open end of the support member 20. Hence, the firebox 50 rests on the support member 20.

The apex of the support member 20 extends upwardly and outside the firebox 50 to form a quadrilateral support along its upper edges on which a heat distributing grill 60 is seated. The heat distributing grill 60 is made of a suitable conductor of heat, such as aluminum, to improve the distribution of heat on a cooking surface. The heat distributing grill 60 is formed with a plurality of parallel air flow openings 60a. Seated on the upper, larger open end of the firebox 50 is a griddle-cover 65.

The griddle-cover 65, in the preferred embodiment, is made of stainless steel. The griddle-cover 65 is formed of a solid centrally located flat plate and parallel rows of openings surrounding the perimeter of the centrally located solid flat plate. Optionally, the griddle-cover 65 or the heat distributing grill 60 can be employed to provide a cooking surface.

For dismantling the cooking unit 10 to form a compact, collapsed unit for ease in storing and transporting, the griddle-cover 65, the heat distributing grill 60, the firebox 50 and the support member 20 are removed in succession. The support member 20 and the firebox 50 are folded, respectively, into compact, generally flat configurations. The folded firebox 50 and the folded support member 20 are disposed, respectively, directly onto the base 15 between the upstanding flanges 16 thereof. Then, the heat distributing grill 60 is placed onto the folded firebox 50 and the folded support member 20 between the upstanding flanges 16 of the base 15. Optionally, the heat distributing grill 60 can be placed on the base 15 and the folded firebox 50 and the folded support member 20 can be disposed directly onto the heat distributing grill 60 between the upstanding flanges 16 of the base 15.

The griddle-cover 65 is placed in a container-closed position over the base 15. The griddle-cover 65 is formed with depending flanges 66 along the perimeter thereof. The flanges 66 of the griddle-cover 65 are disposed within the upstanding flanges 16 of the base 15 to form a container therewith. The yieldable upstanding latch 17 is formed with a lip 68 to clasp the adjacent edge of the griddle-cover 65. The opposite edge of the base 15 is formed with an overhanging ledge 69 under which the opposite edge of the griddle-cover 65 is disposed.

Thus, the griddle-cover 65 is detachably secured to the base 15 by placing one edge thereof under the ledge 69 of the base 15 and the opposite edge thereof below the lip 68 of the latch 17 by moving the yieldable latch 17 away from the griddle-cover 65. The latch 17 is then released to clasp the adjacent edge of the griddle-cover 65. To remove the griddle-cover 65 from the base 15, the latch 17 is moved outwardly away from the griddle-cover 65 and the griddle-cover 65 is moved away from the ledge 69.

In the exemplary embodiment, flammable fuel, such as a canned jellied alcohol or the like in a container 70 is disposed on the base or support 15 (shown in dotted line in FIG. 3). For extinguishing the flame of the canned jellied alcohol, a device 75 is provided. The device 75 is disposed in a slot 76 (FIG. 2) formed in the panel 52 of the support member 50 and is movable over a rectilinear path parallel with the base or support 15. When the canned jellied alcohol is burning for cooking food, the device 75 is extended from the firebox 50 and extends outwardly therefrom in the manner shown in dotted lines in FIG. 3. When the flame of the canned jellied alcohol is to be extinguished, the device 75 is retracted into the firebox 50 through the slot 76 in the panel 52 and provides a cover or a lid for the container 70 of canned jellied alcohol (shown in solid line in FIG. 3).

In the exemplary embodiment, the device 75, when extinguishing a flame, engages the top of the container 70 and the container is substantially at even height with the slot 76. The device 75 is formed with a flange 80 at the inner end thereof to provide a stop when extended out of the firebox 50.

The cooking unit of the present invention is fuel efficient. The truncated, pyramidal configuration of the firebox or cooking chamber is able to reflect a concentrated source of heat and direct the heat along a conductive path that efficiently heats the cooking grill. The stainless steel reflective walls efficiently direct the heat along the conductive path. Black surfaces absorb heat rather than efficiently reflect the heat. The surface angles of a truncated, pyramidal firebox or cooking chamber direct the radiant energy from the combustible fuel along a path to the cooking grill to efficiently heat the cooking grill. In addition to the foregoing, the present invention provides a foldable cooking unit that is compact to facilitate the transportation and storage thereof.

I claim:
1. A cooking unit comprising:
 (a) a support, said support being adapted to support a container of flammable fuel;
 (b) a support member of truncated pyramidal configuration disposed on said support, said support member having an open upper end;
 (c) a firebox of an inverted, truncated pyramidal configuration disposed on said support member, said firebox having an open lower end, the lower end of said firebox being received by the upper open end of said support member; and
 (d) means on said firebox disposable over the container of flammable fuel for extinguishing the flame thereof.

2. A cooking unit as claimed in claim 1 wherein said firebox is formed with a slot in a wall thereof parallel to said support and wherein said means is movable in said slot along a path for positioning at times over said container of flammable fuel for extinguishing the flame thereof and for positioning at other times removed from the container of flammable fuel.

3. A cooking unit as claimed in claim 2 wherein said means has a flange for limiting the movement thereof in said slot.

4. A cooking unit as claimed in claim 2 wherein said slot is disposed generally at even height with the top of the container of flammable material.

5. A cooking unit as claimed in claim 1 wherein said support member comprises panels having trapezoidal configurations and adjacent, non-parallel edges of said panels are hingedly connected for folding and extending said support member, and wherein said firebox comprises panels having trapezoidal configurations and adjacent, non-parallel edges of said panels of said firebox are hingedly connected for folding and extending said firebox.

6. A cooking unit as claimed in claim 5 wherein each panel of a confronting pair of panels of said support member comprises adjacent plates hingedly connected for folding said support member into a generally flat configuration, and wherein each panel of a confronting pair of panels of said firebox comprises adjacent plates hingedly connected for folding said firebox into a generally flat configuration, said firebox being formed with a slot in a panel thereof other than said confronting pair of panels of said firebox, said slot being parallel to said support, and wherein said means is movable in said slot for at times positioning over the container of flammable fuel for extinguishing the flame thereof and at other times for positioning removed from the container of flammable fuel.

7. A cooking unit as claimed in claim 6 wherein said means has a flange for limiting the movement thereof in said slot.

8. A cooking unit as claimed in claim 6 wherein said slot is disposed generally at even height with the top of the container of flammable material.

9. A cooking unit as claimed in claim 6 and further comprising a griddle-cover disposed on said firebox to support food for cooking.

10. A cooking unit as claimed in claim 9 and comprising a heat distributing grill disposed within said firebox below said griddle-cover.

11. A cooking unit as claimed in claim 9 wherein said griddle-cover is removed from said firebox, said firebox is removed from said support member and folded to a generally flat configuration, said means is disposed generally parallel to said folded firebox, said support member is removed from said support and folded to a generally flat configuration, and wherein said folded support member, said folded firebox, and said means are contained between said support and said griddle-cover, whereby said cooking unit is adapted for transportation or storage.

12. A cooking unit as claimed in claim 10 wherein said griddle-cover and said heat distributing grill are removed from said firebox, said means is extended from said firebox, said firebox is removed from said support member and folded to a generally flat configuration, said support member is removed from said support and folded to a generally flat configuration, and wherein said folded support member, said folded firebox, said means, and said heat distributing grill are contained between said support and said griddle-cover, whereby said cooking unit is adapted for transportation or storage.

* * * * *